United States Patent
Frederiksen et al.

(10) Patent No.: US 10,845,482 B2
(45) Date of Patent: Nov. 24, 2020

(54) LIDAR SENSOR FOR DETECTING AN OBJECT

(71) Applicant: Robert Bosch GmbH, Stuttgart (DE)

(72) Inventors: Annette Frederiksen, Renningen (DE); Ernst Kretzek, Pforzheim (DE); Juergen Hasselbach, Stuttgart (DE); Siegwart Bogatscher, Sersheim (DE); Stefanie Mayer, Rottenburg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 15/727,192

(22) Filed: Oct. 6, 2017

(65) Prior Publication Data
US 2018/0106901 A1    Apr. 19, 2018

(30) Foreign Application Priority Data
Oct. 19, 2016  (DE) .................. 10 2016 220 468

(51) Int. Cl.
| | |
|---|---|
| *G01S 17/08* | (2006.01) |
| *G01S 7/481* | (2006.01) |
| *G01S 7/499* | (2006.01) |
| *G01S 17/88* | (2006.01) |

(52) U.S. Cl.
CPC ............ *G01S 17/08* (2013.01); *G01S 7/4815* (2013.01); *G01S 7/4816* (2013.01); *G01S 7/499* (2013.01); *G01S 17/88* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,476,980 | B2 * | 10/2016 | Thayer ................ | G01S 7/499 |
| 9,658,322 | B2 * | 5/2017 | Lewis ................ | G02B 26/108 |
| 9,791,555 | B2 * | 10/2017 | Zhu .................... | G01S 17/08 |
| 10,302,746 | B2 * | 5/2019 | O'Keeffe ............ | G01S 7/4811 |

(Continued)

FOREIGN PATENT DOCUMENTS

| | | |
|---|---|---|
| DE | 102011076493 A1 | 11/2012 |
| DE | 102014107353 A1 | 11/2015 |

(Continued)

*Primary Examiner* — Yuqing Xiao
*Assistant Examiner* — Amir J Askarian
(74) *Attorney, Agent, or Firm* — Norton Rose Fulbright US LLP; Gerard Messina (57) ABSTRACT

A LIDAR sensor for detecting an object in the surroundings, and to a method for activating a LIDAR sensor, the LIDAR sensor including at least one transmitting unit for emitting electromagnetic radiation, at least one receiving unit for receiving electromagnetic radiation which was reflected by the object, at least one refractive element, which is at least partially pervious to the electromagnetic radiation, and a rotating unit, which includes at least the at least one refractive element, the at least one transmitting unit and the at least one receiving unit. The core of the invention is that the at least one refractive element includes at least one optical lens and a beam splitter for splitting the electromagnetic radiation, two focal planes being present. The at least one transmitting unit and the at least one receiving unit are positioned in at least one focal plane of at least one refractive element.

20 Claims, 9 Drawing Sheets

(56) References Cited

U.S. PATENT DOCUMENTS

| | | | |
|---|---|---|---|
| 2004/0233460 A1 | 11/2004 | Ura et al. | |
| 2014/0034817 A1 | 2/2014 | Nakamura et al. | |
| 2015/0185313 A1* | 7/2015 | Zhu | G01S 17/08 |
| | | | 356/5.01 |
| 2016/0216370 A1* | 7/2016 | Shimon | G01S 7/4811 |
| 2016/0259038 A1* | 9/2016 | Retterath | G01S 7/4865 |
| 2016/0282453 A1* | 9/2016 | Pennecot | G01S 17/06 |
| 2016/0363669 A1* | 12/2016 | Liu | G01S 7/4815 |
| 2017/0269215 A1* | 9/2017 | Hall | G01S 17/10 |
| 2017/0307759 A1* | 10/2017 | Pei | G01S 7/4816 |
| 2018/0106900 A1* | 4/2018 | Droz | G01J 1/0488 |
| 2019/0032900 A1* | 1/2019 | Joo | F21V 14/02 |
| 2019/0204423 A1* | 7/2019 | O'Keeffe | G01S 7/4814 |

FOREIGN PATENT DOCUMENTS

| | | |
|---|---|---|
| DE | 202015101912 U1 | 7/2016 |
| WO | 15026471 A1 | 2/2015 |

\* cited by examiner

LIDAR SENSOR FOR DETECTING AN OBJECT

CROSS REFERENCE

The present application claims the benefit under 35 U.S.C. 119 of German Patent Application No. DE 102016220468.8 filed on Oct. 19, 2016, which is expressly incorporated herein by reference in its entirety.

FIELD

The present invention relates to a LIDAR sensor for detecting an object in the surroundings and to a method for detecting an object using a LIDAR sensor.

BACKGROUND INFORMATION

Conventional LIDAR (light detection and ranging) sensors may be used to detect objects in the surroundings of the LIDAR sensor. A transmitting unit emits radiation into the surroundings, from which it is reflected or scattered back by objects and received by a receiving unit of the LIDAR sensor. In conventional rotating LIDAR sensors, so-called macroscanners, the optical axes of the transmitting unit and the receiving unit extend in parallel at a certain distance. With such macroscanners, a deflection unit in the form of a mirror or a mirror system, for example, may be rotatably arranged. Furthermore, corresponding macroscanners are known, in which the transmitting unit and the receiving unit are situated on a rotating unit. These macroscanners have a relatively large overall volume and, in particular, a relatively large overall height.

A LIDAR component is described in PCT Application No. WO15026471. The component includes a housing, which is configured to rotate about an axis. The housing has an inner space which includes a transmitting unit, a receiving unit and a shared area. In the shared area, the transmitting unit has an exit aperture, and the receiving unit has an entrance aperture. The component furthermore includes a plurality of light sources. These are designed for emitting a plurality of light beams, which enter the shared area through the exit aperture and pass through the shared area via a transmission path. The light beams have light of wavelengths in a wavelength range. The component furthermore includes a plurality of detectors in the receiving unit. The plurality of detectors is designed to detect light having wavelengths in a wavelength range. The component furthermore includes an optical lens, which is attached to the housing. The optical lens is designed for receiving light beams via a transmission path, and to collimate the light beams for transmission into the surroundings of the LIDAR component. The collimated light beams are reflected by one or multiple objects in the surroundings of the LIDAR component, and the reflected light is collected by the optical lens. The optical lens focuses the collected light onto the detectors via a reception path, which extends through the entire shared area and the reception aperture of the receiving unit.

SUMMARY

The present invention is directed to a LIDAR sensor for detecting an object in the surroundings. The LIDAR sensor includes at least one transmitting unit for emitting electromagnetic radiation and at least one receiving unit for receiving electromagnetic radiation, which was reflected by the object. The LIDAR sensor furthermore includes at least one refractive element, which is at least partially pervious to the electromagnetic radiation, and a rotating unit, which includes at least the at least one refractive element, the at least one transmitting unit and the at least one receiving unit.

According to the present invention, the at least one refractive element includes at least one optical lens and a beam splitter for splitting the electromagnetic radiation, two focal planes being present. The at least one transmitting unit and the at least one receiving unit are positioned in at least one focal plane of at least one refractive element.

The at least one optical lens, as part of the refractive element, has only one focal plane. Since the beam splitter is also part of the refractive element, a total of two focal planes are present for the refractive element. For example, the LIDAR sensor may include a refractive element formed of a beam splitter and an optical lens. For example, the LIDAR sensor may include a refractive element formed of a beam splitter and two optical lenses. The LIDAR sensor may furthermore include two refractive elements, for example. Each of the two refractive elements may be formed of a beam splitter and an optical lens. Each of the two refractive elements may be formed of one beam splitter and two optical lenses. One of the two refractive elements may be formed of one beam splitter and one optical lens, and the other of the two refractive elements may be formed of one beam splitter and two optical lenses.

An advantage of the present invention is that the overall volume and/or the overall height of the LIDAR sensor may be reduced compared to conventional approaches. It is possible to reduce the diameter of the rotating unit. Furthermore, certain optical elements may be dispensed with. It may be possible that no respective separate optical lenses are necessary for the transmission beam path and the reception beam path. It is possible that the same optical lens may be used for the transmission beam path and the reception beam path. By rotating the rotating unit, measurements may be implemented across an angular range of up to 360°. It is also possible to implement measurements across an angular range which is smaller than 360°.

The optical lens, as part of the refractive element, may be pervious to the electromagnetic radiation. Furthermore, the optical lens may act refractively on the electromagnetic radiation. Refraction may take place when the electromagnetic radiation passes through the optical lens. The beam splitter may be pervious to portions of the electromagnetic radiation and reflective for other portions. The beam splitter may split the radiation at a defined ratio. This ratio may be dependent on the configuration and/or the materials of the beam splitter and the physical properties of the electromagnetic radiation.

An object within the meaning of the present invention may have an interface on which the electromagnetic radiation may be reflected. The electromagnetic radiation may also be scattered on a scatter center of an object. An object within the meaning of the present invention may be movable or also immovable. An object may, for example, be a living being or an inanimate obstacle in the surroundings. An object may, for example, be a road user, a vehicle and/or a traffic control device. An object may, for example, also be an atom or a dust particle or a water droplet in the surroundings.

Within the meaning of the present invention, detecting an object may be understood to mean that the distance of an object from the LIDAR sensor is detected. It is also possible to detect movement properties of the object. It is also possible to detect the location of an object. It is also possible to detect the orientation of an object. It is possible to detect the speed of an object. It is possible to detect the acceleration of an object. It is possible to detect the moving direction of an object. The size of an object may be detected. The physical properties of an object may be detected. It is possible to draw conclusions on the material of the object. It is possible to draw conclusions on the degree of reflection of the object. It is possible to draw conclusions on the reflectivity of the object. It is possible to establish whether an object is moist. It is possible to establish whether water is present on the surface of an object. It is possible to establish whether an object is iced over. It is possible to establish whether ice is present on the surface of an object.

In one advantageous embodiment of the present invention, it is provided that the beam splitter splits the electromagnetic radiation in a polarization-selective and/or wavelength-selective manner. The advantage of this embodiment is that conclusions may be drawn regarding the physical properties of the object on which the electromagnetic radiation was reflected.

For example, the polarization preservation properties of the measured objects may be detected.

In one further advantageous embodiment of the present invention, it is provided that further wavelength-selective and/or polarization-selective and/or polarization-altering components are provided in the beam path of the transmitting unit and/or of the receiving unit. One or multiple wavelength-selective filter elements may be present in the LIDAR sensor. One or multiple polarization-selective filter elements may be present in the LIDAR sensor. One or multiple bandpass filters may be present in the transmitting unit of the LIDAR sensor. One or multiple bandpass filters may be present in the receiving unit of the LIDAR sensor. One or multiple polarization filters may be present in the transmitting unit of the LIDAR sensor. One or more polarization filters may be present in the receiving unit of the LIDAR sensor. Such components may be used so that the LIDAR sensor emits electromagnetic radiation of a predefined wavelength into the surroundings. Such components may be used so that the LIDAR sensor emits electromagnetic radiation of a predefined polarization into the surroundings. They may also be used so that preferably electromagnetic radiation of a predefined wavelength reaches the receiving unit of the LIDAR sensor. Such components may also be used so that preferably electromagnetic radiation of a predefined polarization reaches the receiving unit of the LIDAR sensor. In this way, it may be ensured that preferably electromagnetic radiation, which was reflected in the surroundings by the object, reaches the receiving unit of the LIDAR sensor. Interfering background radiation which has a different wavelength and/or different polarization does not reach the receiving unit of the LIDAR sensor, or only in a highly attenuated form. In this way, the signal-to-noise ratio may be improved. Polarization-altering components may be retardation plates, for example. These are also referred to as small $\lambda/n$ plates. When electromagnetic radiation passes through such components, the polarization and phase of the radiation may be altered. For example, small $\lambda/4$ plates are known, which are able to convert linearly polarized electromagnetic radiation into circularly or elliptically polarized electromagnetic radiation. Small $\lambda/4$ plates are also able to convert circularly polarized electromagnetic radiation into linearly polarized electromagnetic radiation. Small $\lambda/2$ plates are able to rotate the polarization direction of linearly polarized electromagnetic radiation by a selectable angle.

In one further advantageous embodiment of the present invention, it is provided that the beam splitter is formed by a polarization-selective and/or wavelength-selective holographic element. The advantage of this embodiment is that the overall volume and/or the overall height of the LIDAR sensor may be reduced even further. With holographic optical elements, the splitting of the electromagnetic radiation and the radiation deflection of the one portion of the electromagnetic radiation is achieved by diffraction on a volume grating. Volume gratings are foils which are exposed in an interference lithography process, for example. As a result of the exposure and/or the subsequent development process, the volume gratings may be given different optical functionalities. One optical functionality may be a polarization selectivity. One optical functionality may be a wavelength selectivity. The holographic optical elements may also be manufactured by cost-effective printing processes. The manufacture of the holographic optical elements with the aid of holographic multiplexing may be avoided. The holographic optical elements may have high diffraction efficiencies. By using thin foils, the overall volume of a LIDAR sensor may be reduced. By using shapeable foils, the overall volume of a LIDAR sensor may be reduced. By using thin foils, the overall height of a LIDAR sensor may be reduced. By using shapeable foils, the overall height of a LIDAR sensor may be reduced. The holographic optical elements may have a transmitting effect on the electromagnetic radiation. The holographic optical elements may have a reflecting effect on the electromagnetic radiation. They may be deliberately manufactured for certain angles of incidence and angles of reflection. They may be deliberately manufactured for certain diffraction angles. In this way, they make new configurations of the LIDAR sensor possible. The holographic optical elements may also include further optical functionalities. In addition to their filter functions, they may focus electromagnetic radiation onto a detector of the receiving unit, for example. Or they may alter the beam shape of the electromagnetic radiation.

In one further advantageous embodiment of the present invention, it is provided that the at least one transmitting unit is designed for emitting electromagnetic radiation of a selective wavelength range and/or of a selective polarization direction. The advantage of this embodiment is that objects in the surroundings may be detected with better accuracy. The wavelength of the emitted electromagnetic radiation may thus be selected in such a way that preferably precise measuring results are achieved with known surroundings conditions, such as a certain atmospheric attenuation. Different wavelengths may also have specific advantages and/or disadvantages with respect to reflectivities of different objects. By deliberately selecting the wavelength of the emitted electromagnetic radiation, it is possible, in turn, to achieve preferably precise measuring results.

In one further advantageous embodiment of the present invention, it is provided that the LIDAR sensor includes at least two transmitting units. The wavelength range and/or the polarization direction of the emitted electromagnetic radiation of the first transmitting unit differs from the wavelength range and/or the polarization direction of the emitted electromagnetic radiation of the second transmitting unit. The advantage of this embodiment is that it is possible to measure two different wavelengths simultaneously. Another advantage of this embodiment is that it is possible to measure two different polarization directions. A previously detected object may be measured a second time by a second measurement using a different wavelength. A previously detected object may be measured a second time by a second measurement using a different polarization direction. The first measurement may thus be verified.

In one further advantageous embodiment of the present invention, it is provided that the at least one receiving unit is designed for receiving electromagnetic radiation of a certain wavelength range and/or of a certain polarization direction. This may be implemented in that corresponding wavelength-selective components are present in the receiving unit. A wavelength-selective component may be a bandpass filter, for example. Or at least one detector, as an integral part of the receiving unit, may be wavelength-selective. The detector may be designed to have differing sensitivities for different wavelengths. The advantage of this embodiment is that objects in the surroundings may be detected with better accuracy. A wavelength range may be selected, in which preferably precise measuring results are achieved with known surroundings conditions, such as a certain atmospheric attenuation. Different wavelengths may have specific advantages and/or disadvantages with respect to reflectivities of different objects. By deliberately selecting the wavelength of the received electromagnetic radiation, it may be controlled which objects are detected. In turn, it is possible to achieve preferably precise measuring results.

In one further advantageous embodiment of the present invention, it is provided that the LIDAR sensor includes at least two receiving units. The wavelength range and/or the polarization direction of the electromagnetic radiation received by the first receiving unit differs from the wavelength range and/or the polarization direction of the electromagnetic radiation received by the second receiving unit. The advantage of this embodiment is that it is possible to measure two different wavelengths simultaneously. Another advantage of this embodiment is that it is possible to measure two different polarization directions simultaneously. A previously detected object may be measured a second time by a second measurement using a different wavelength. A previously detected object may be measured a second time by a second measurement using a different polarization direction. The first measurement may thus be verified.

The wavelength range and/or the polarization direction of the emitted and the received electromagnetic radiation may be matched to one another. This advantageously takes place in such a way that the receiving unit is sensitive for the wavelength range and/or the polarization direction of the emitted electromagnetic radiation.

In one further advantageous embodiment of the present invention, it is provided that the at least one transmitting unit is a laser. It may preferably be a one-dimensional laser bar or a two-dimensional laser matrix. A one-dimensional laser bar may be made up of multiple laser diodes or transmitting lasers, which are situated in a linear arrangement, i.e., in a row. In the two-dimensional laser matrix, multiple laser diodes are situated in a matrix, i.e., in a two-dimensional arrangement. Furthermore, it is provided that the at least one receiving unit is a linear detector array or a two-dimensional detector array. It may include multiple detection channels, which are situated in a linear arrangement, i.e., in a row. Or the multiple detection channels are situated in a matrix, i.e., in a two-dimensional arrangement. The receiving unit is sensitive for electromagnetic radiation. The advantage of this embodiment is that the use of a laser bar or a laser matrix, and the use of a linear detector array or of a two-dimensional detector array, makes the optical resolution in a further axis possible. The LIDAR sensor may include a one-dimensional laser bar and a linear detector array. The LIDAR sensor may include a one-dimensional laser bar and a two-dimensional detector array. The LIDAR sensor may include a two-dimensional laser matrix and a linear detector array. The LIDAR sensor may include a two-dimensional laser matrix and a two-dimensional detector array.

The optical resolution of the LIDAR sensor in the axis, which is perpendicular to the rotational axis of the rotating unit, may be achieved by the rotation of the rotating unit. The optical resolution in the further axis may be achieved in that, for example, a laser bar and a linear detector array are aligned in parallel to the rotational axis of the rotating unit. The electromagnetic radiation may thus be emitted perpendicularly to the rotational axis of the rotating unit, and also be received perpendicularly to this rotational axis. The individual laser diodes of the laser bar or of the laser matrix may be activated simultaneously or at different points in time. In this way, it is possible to create discretely settable radiation angles. At the same time, the respective detection channel of a detector array or of a detector matrix corresponding to a laser diode may be activated. It is also possible to control the laser diodes and the detection channels in such a way that measurement with multiple angles simultaneously is possible.

In one further advantageous embodiment of the present invention, it is provided that the LIDAR sensor includes at least two receiving units. The one receiving unit is positioned in a first focal plane, and the other receiving unit is positioned in a second focal plane aligned in parallel to the first focal plane. The two receiving units are situated offset from one another by a predefined distance along the alignment of the focal planes. The advantage of this embodiment is that the angular resolution of the LIDAR sensor along an axis may be doubled.

According to the present invention, moreover a method for activating a LIDAR sensor for detecting an object in the surroundings is described. The LIDAR sensor includes at least one transmitting unit for emitting electromagnetic radiation and at least one receiving unit for receiving electromagnetic radiation, which was reflected by the object. The LIDAR sensor furthermore includes at least one refractive element, which is at least partially pervious to the electromagnetic radiation, and a rotating unit, which includes at least the at least one refractive element, the at least one transmitting unit and the at least one receiving unit. Furthermore, the at least one refractive element includes at least one optical lens and a beam splitter for splitting the electromagnetic radiation, two focal planes being present. The at least one transmitting unit and the at least one receiving unit are positioned in at least one focal plane of at least one refractive element.

The activation of the LIDAR sensor within the meaning of the present invention may include the step of emitting electromagnetic radiation into the surroundings. By activating the rotating unit, the electromagnetic radiation may be emitted in different directions or at different angles into the surroundings. By activating different transmitting lasers of the transmitting unit, the electromagnetic radiation may be emitted in different directions or at different angles into the surroundings. The activation of the LIDAR sensor may furthermore include the step of receiving electromagnetic radiation from the surroundings. By activating the rotating unit, electromagnetic radiation, which is incident upon the LIDAR sensor from different directions or at different angles, may be deliberately received by the receiving unit. By activating different detection channels of the receiving unit, electromagnetic radiation, which is incident upon the LIDAR sensor from different directions or at different angles, may be deliberately received by the receiving unit. The activation of the LIDAR sensor may include a step for activating at least one wavelength-selective component. The activation of the LIDAR sensor may include a step for activating at least one polarization-selective component. The activation of the LIDAR sensor may include a step for activating at least one polarization-altering component. For example, a polarization-selective component may be present in the form of a liquid crystal retarder unit in the LIDAR sensor. This may be activated in such a way that electromagnetic radiation of a predefined polarization is reflected. This may also be activated in such a way that electromagnetic radiation of a predefined polarization is transmitted.

In one advantageous embodiment of the present invention, a method for activating a LIDAR sensor is provided, the LIDAR sensor including at least two receiving units. The wavelength range and/or the polarization direction of the electromagnetic radiation received by the first receiving unit differs from the wavelength range and/or the polarization direction of the electromagnetic radiation received by the second receiving unit. The reception of the electromagnetic radiation takes place in such a way that electromagnetic radiation, which is reflected by an object within an angular range, is received by the one receiving unit in one step, and by the other receiving unit in another step. The advantage of this embodiment is that an object, which is situated within the angular range in the surroundings of the LIDAR sensor, may be detected both by the one and by the other receiving unit. The detection of an object with the aid of the first receiving unit may be verified by the detection of the same object with the aid of the second receiving unit.

In one advantageous embodiment of the present invention, a method for activating a LIDAR sensor is provided, in which the reception of the electromagnetic radiation takes place in such a way that the electromagnetic radiation is received in a randomly determined chronological sequence at any angle of the angular range by the at least one receiving unit. As an alternative or in addition, the emission of the electromagnetic radiation may take place in such a way that the transmitting lasers of the transmitting unit are operated in a randomly determined chronological sequence. The advantage of this embodiment is that it is possible to implement random scan patterns. The activation of the individual transmitting lasers of a transmitting unit may take place randomly, for example. The activation of the rotating unit may also take place in such a way that random scan patterns are implemented. With a LIDAR sensor including two receiving units, the activation of the rotating unit, and of the first and second receiving units, for example, may take place in such a way that the electromagnetic radiation is alternately received by the first receiving unit and the second receiving unit in a random sequence. An object within an angular range of the surroundings may, for example, be detected within a randomly determined number of measuring steps with the aid of the first receiving unit. Thereafter, the rotating unit may be activated in such a way that the same object is detected within the same angular range of the surroundings within a randomly determined number of measuring steps with the aid of the second receiving unit. The scan pattern may be configured to be very flexible or not very predictable by randomly switching back and forth between the first receiving unit and the second receiving unit. The detection of ghost objects, for example due to the electromagnetic radiation of lasers situated outside the LIDAR sensor, is made significantly more difficult. By varying the pulse rate with which the electromagnetic radiation of the LIDAR sensor is emitted, the detection of electromagnetic radiation of radiation sources outside the LIDAR sensor may be made even more difficult or impossible.

BRIEF DESCRIPTION OF THE DRAWINGS

One exemplary embodiment of the present invention is described in greater detail hereafter based on the figures.

DETAILED DESCRIPTION OF EXAMPLE EMBODIMENTS

Figure 1:
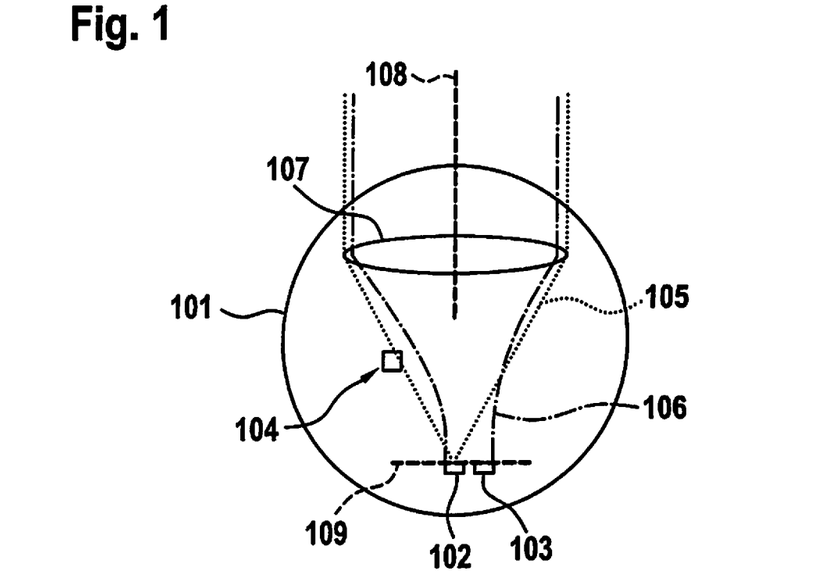
FIG. 1 shows a LIDAR sensor including a rotating unit, a transmitting unit, a receiving unit and an optical lens.

FIG. 1 shows the configuration of a LIDAR sensor by way of example. This sensor includes a rotating unit 101, on which a transmitting unit 102, a receiving unit 103 and an optical lens 107 are situated. Transmitting unit 102 and receiving unit 103 are both situated in focal plane 109 of optical lens 107. Transmitting unit 102 emits electromagnetic radiation 105. Electromagnetic radiation 105 reaches the surroundings of the LIDAR sensor through optical lens 107. In the surroundings, electromagnetic radiation 105 may be reflected on an object and subsequently be received as electromagnetic radiation 106 by the LIDAR sensor. Electromagnetic radiation 106 is transmitted by optical lens 107 and focused onto focal plane 109 of optical lens 107. The beam path of the emitted electromagnetic radiation 105 and the beam path of the received electromagnetic radiation 106 are positioned on top of one another, i.e., situated coaxially in a shared optical axis. It is possible that electromagnetic radiation 106, which was previously reflected on an object in the immediate surroundings of the LIDAR sensor, may be receivable with the aid of receiving unit 103 only imprecisely, or not all, in such a way that precise detection of the object may be achieved. The immediate surroundings of the LIDAR sensor are, for example, the surroundings situated up to a distance of 100 times the focal length of optical lens 107 around the LIDAR sensor. At a focal length of optical lens 107 of 2 cm, for example, objects which are situated up to a distance of 2 m away from the LIDAR sensor are situated in its immediate surroundings. The cause of the difficulty of detecting an object in the immediate surroundings may be that portions of electromagnetic radiation 105 emitted by transmitting unit 102 interfere with receiving unit 103. To still detect objects in the immediate surroundings of the LIDAR sensor, the LIDAR sensor may furthermore include a second receiving unit 104. Receiving unit 104 may be designed as a close range detector or as a close range detector array. It may couple out a portion of the received electromagnetic radiation 106.

Figure 2:
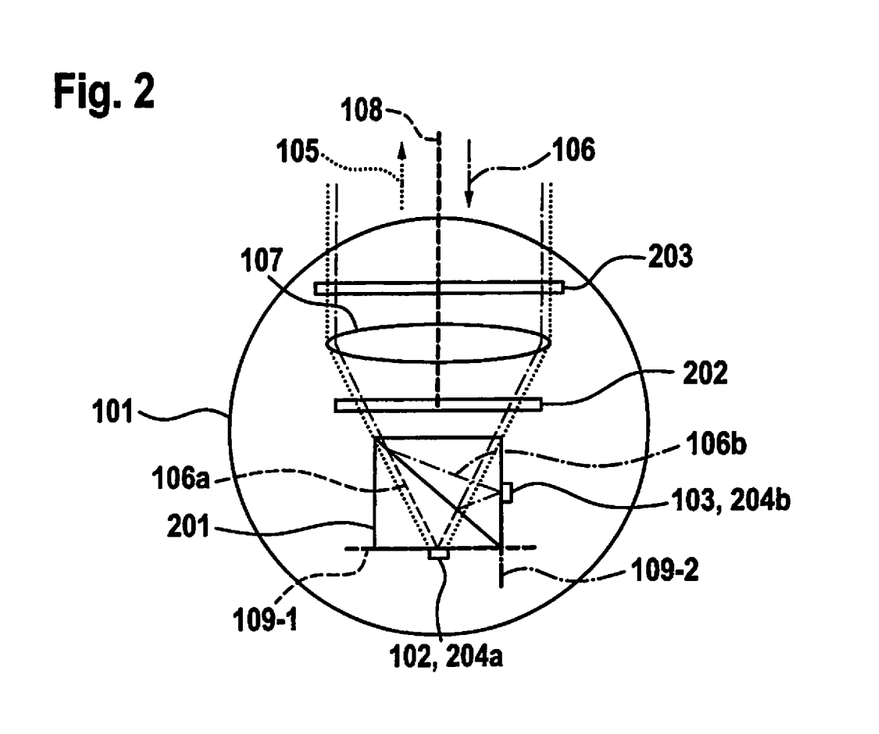
FIG. 2 shows a LIDAR sensor including a beam splitter as part of the refractive element.

FIG. 2 shows by way of example a LIDAR sensor on a rotating unit 101, in which the refractive element includes an optical lens 107 and a beam splitter 201 for splitting the electromagnetic radiation. Due to beam splitter 201, two focal planes 109-1 and 109-2 are present. The transmitting unit and the receiving unit are positioned in these two focal planes.

Figure 3A:
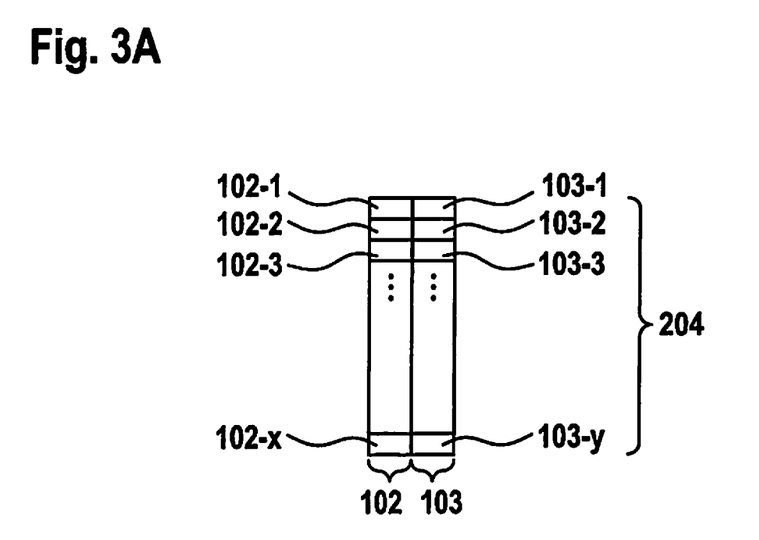
FIG. 3A shows one option of a spatial arrangement of the transmitting unit and of the receiving unit.
Figure 3B:
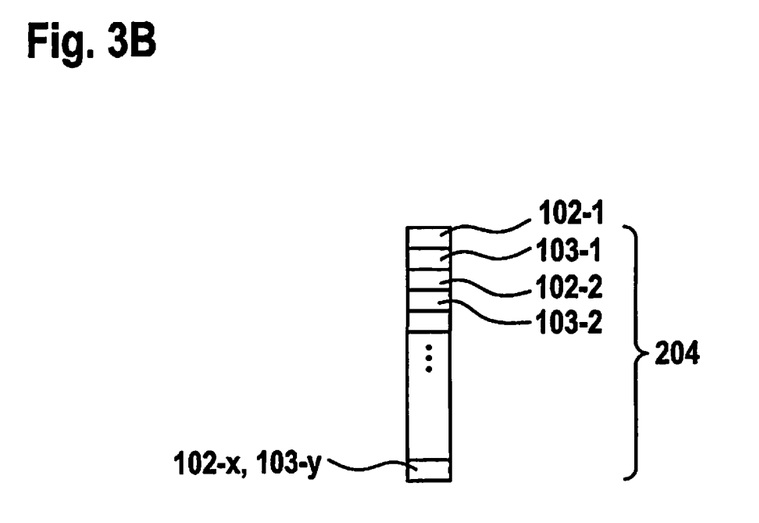
FIG. 3B shows another option of a spatial arrangement of the transmitting unit and of the receiving unit.

A variety of options are available for the spatial arrangement of the at least one transmitting unit 102 and the at least one receiving unit 103 in the LIDAR sensor. For example, the at least one transmitting unit 102 and the at least one receiving unit 103 may be positioned spatially separated from one another. Transmitting unit 102 may, for example, be designed as a linear laser bar or a two-dimensional laser matrix, which are each composed of multiple laser diodes 102-1 through 102-$x$. Here, $x$ denotes the number of the laser diodes. Receiving unit 103 may, for example, be designed as a linear detector array or a two-dimensional detector matrix, which are each composed of multiple detection channels 103-1 through 103-$y$. Here, $y$ denotes the number of the detection channels. The spatial arrangement may also be in the manner that a linear laser bar 102 and a linear detector array 103 have interfaces making contact with one another. This creates a combination 204 of a transmitting unit 102 and a receiving unit 103, as it is shown in FIG. 3A. Another option of the spatial arrangement of the at least one transmitting unit 102 and the at least one receiving unit 103 is that laser diodes 102-1 through 102-$x$ of transmitting unit 102, and detection channels 103-1 through 103-$y$ of receiving unit 103, are jointly situated in a linear array. Such a combination 204 of a transmitting unit 102 and a receiving unit 103 is shown in FIG. 3B.

A transmitting unit 102 or a combination 204$a$ of a transmitting unit 102 and a receiving unit 103 may be positioned in focal plane 109-1 shown in FIG. 2. A receiving unit 103 or a second combination 204$b$ of a transmitting unit 102 and a receiving unit 103 may be positioned in focal plane 109-2. In the shown example, electromagnetic radiation 105 is emitted by transmitting unit 102 or combination 204$a$ positioned in focal plane 109-1. It is possible, for example, that the emitted electromagnetic radiation 105 is linearly polarized. As shown in the example, polarization-selective beam splitter 201 may be almost completely pervious to, for example, vertically linearly polarized electromagnetic radiation. No energy is lost on beam splitter 201 when electromagnetic radiation 105 passes through beam splitter 201. In the shown example, electromagnetic radiation 105 furthermore passes through an optical component 202, which acts on the phase of electromagnetic radiation. This may be a small $\lambda/4$ plate, for example, which in the example is able to convert the, for example, vertically linearly polarized electromagnetic radiation into, for example, right circularly polarized electromagnetic radiation 105. Furthermore, electromagnetic radiation 105 may pass through an optical lens 107. Furthermore, electromagnetic radiation 105 may pass through an optical filter 203. In the example, the now, for example, right circularly polarized electromagnetic radiation 105 is emitted into the surroundings of the LIDAR sensor. There, it may be scattered and/or reflected on an object. Electromagnetic radiation 106 scattered back and/or reflected by the object may either be polarized, partially polarized or unpolarized. If the circularly polarized electromagnetic radiation 105 emitted in the example is reflected, for example, on a metallic object, it may experience a phase jump by half a wavelength, and is subsequently left circularly polarized. The scattered back and/or reflected electromagnetic radiation 106 may reach the LIDAR sensor. It passes through optical filter 203, for example, and may be refracted by optical lens 107. If electromagnetic radiation 106, on the path to the receiving unit, again passes through a component 202, the phase of electromagnetic radiation 106 may be altered. In the example, left circularly polarized electromagnetic radiation 106 may be converted by small $\lambda/4$ plate 202 into horizontally linearly polarized electromagnetic radiation 106. This may subsequently be reflected on beam splitter 201, which is reflective for horizontally linearly polarized electromagnetic radiation. It may be focused as electromagnetic radiation 106$b$ onto receiving unit 103 or combination 204$b$ situated in focal plane 109-2. It may accordingly be assumed that signals, which are received by receiving unit 103 or combination 204$b$, were caused by the reflection on a metallic object. If, in contrast, the emitted electromagnetic radiation 105 is reflected on a non-metallic object, the, for example, right circular polarization may be reflected as unpolarized light by the object. In the example, the scattered back and/or reflected electromagnetic radiation 106 is not altered by small $\lambda/4$ plate 202 and is subsequently split on beam splitter 201 into two sub-beams. A portion may be focused as radiation 106$a$ onto combination 204$a$ situated in focal plane 109-1, and another portion may be focused as radiation 106$b$ onto combination 204$b$ situated in focal plane 109-2.

Figure 4:
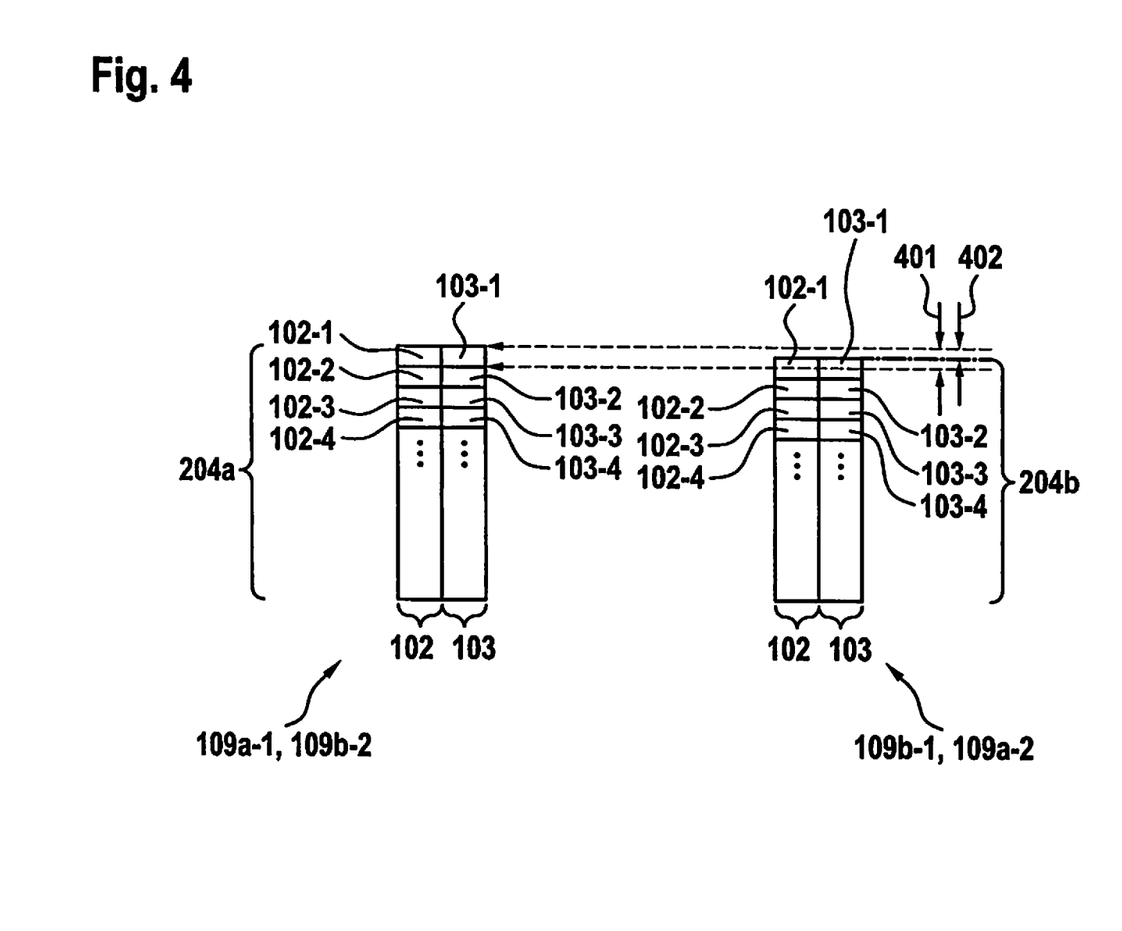
FIG. 4 shows further options of the spatial arrangement of transmitting units and receiving units.

FIG. 4 shows another option of the spatial arrangement of a transmitting unit 102 and a receiving unit 103. For example, a LIDAR sensor may include a combination 204$a$ in a focal plane 109-1 (see FIG. 3) and a combination 204$b$ in a focal plane 109-2 (see FIG. 3). The two combinations 204$a$ and 204$b$ may be aligned in parallel to the rotational axis of rotating unit 101 and be situated offset from one another by a distance 402 in focal planes 109-1 and 109-2. Distance 402 may correspond exactly to half a bar pitch, for example. A bar pitch may be understood to mean the central distance between the laser diodes of a laser bar or of a laser matrix. A bar pitch may also be understood to mean the spatial expansion of a laser diode along the axis of a one-dimensional laser bar or along an axis of a two-dimensional laser matrix. FIG. 4 shows bar pitch 401 of laser diode 102-1 of laser bar 102 by way of example. Due to the offset of the two combinations 204$a$ and 204$b$, the angular resolution along an axis situated in parallel to the rotational axis of rotating unit 101 may be doubled.

Figure 5:
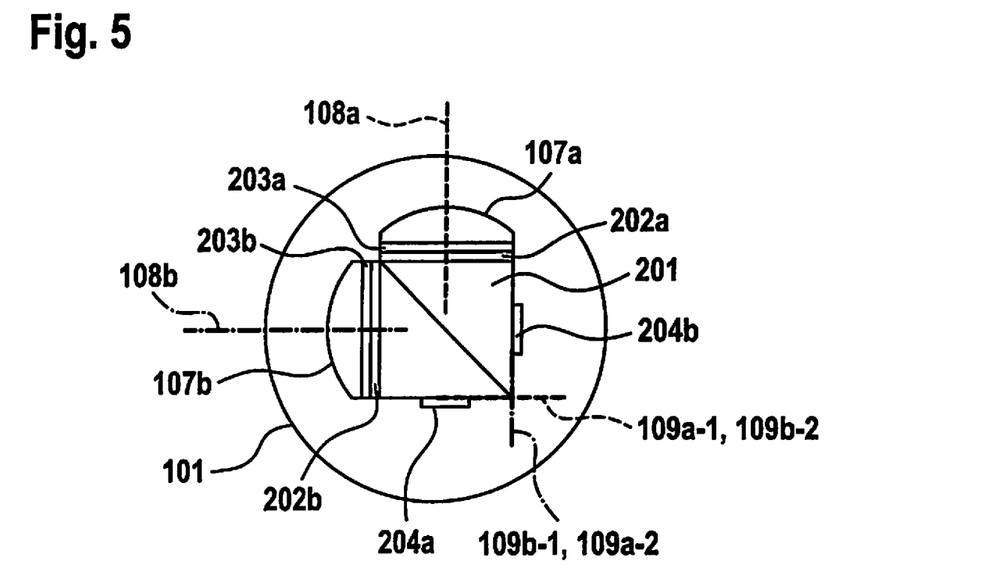
FIG. 5 shows a LIDAR sensor including a beam splitter as part of the refractive element, and two receiving units and two transmitting units.

FIG. 5 shows a LIDAR sensor on a rotating unit 101, including a beam splitter 201 as part of the refractive element, and two receiving units and two transmitting units. The two transmitting units and the two receiving units are each part of the two combinations 204a and 204b. In this exemplary embodiment, the LIDAR sensor furthermore includes two optical lenses 107a and 107b. First optical lens 107a, together with beam splitter 201, may thus form a first refractive element. Optical lens 107a may act refractively on electromagnetic radiation which is emitted or received along optical axis 108a of optical lens 107a. Second optical lens 107b, together with beam splitter 201, may form a second refractive element. Optical lens 107b may act refractively on electromagnetic radiation which is emitted or received along optical axis 108b of optical lens 107b. Due to the presence of beam splitter 201, each of the two refractive elements has two focal planes. The first refractive element forms a first focal plane 109a-1 and a second focal plane 109a-2. The second refractive element forms a first focal plane 109b-1 and a second focal plane 109b-2. Since in the shown example the same beam splitter 201 in each case is part of the two refractive elements, focal plane 109a-1 may be identical to focal plane 109b-2, and focal plane 109a-2 may be identical to focal plane 109b-1. Furthermore, an optical filter 203a and/or an optical component 202a, which acts on the phase of the transmitted electromagnetic radiation, may be present along the optical axis of optical lens 107a. Furthermore, an optical filter 203b and/or an optical component 202b, which acts on the phase of the transmitted electromagnetic radiation, may be present along the optical axis of optical lens 107b. The arrangement of the various optical components along the optical axes may correspond to the arrangement as was shown in FIG. 2. Alternatively, it is also possible to select the arrangement shown in FIG. 5. Compared to FIG. 2, the sequence of the optical components is different here. Additionally, the components are attached in a very compact manner. In this way, it is possible to eliminate many adjustment degrees of freedom with a mechanical stop.

The two combinations 204a and 204b shown in FIG. 5 may include laser diodes, which are such that the wavelength of electromagnetic radiation 105 emitted by the laser diodes of combination 204a differs from the wavelength of electromagnetic radiation 105 emitted by the laser diodes of combination 204b. Optical filters 203a and 203b may each include a suitable bandpass for the different wavelengths. The detection channels of combinations 204a and 204b may be sensitive for both wavelengths of the received electromagnetic radiation 106. The detection channels of combinations 204a and 204b may each be sensitive for one of the two wavelengths of the received electromagnetic radiation 106. It is possible that the two combinations 204a and 204b have differing sensitivities for the two wavelengths of the received electromagnetic radiation 106. With the aid of such a LIDAR sensor, it is possible to simultaneously carry out measurements using electromagnetic radiation of two wavelengths. As a result of such secondary measurements, the presence of a detected object may be verified by a measurement using electromagnetic radiation of a second wavelength. Depending on the wavelength, the use of electromagnetic radiation of differing wavelengths may have specific advantages and/or disadvantages, for example with respect to atmospheric attenuation and/or reflectivities of objects. Due to the use of electromagnetic radiation of differing wavelengths, it is thus possible to detect more objects, if necessary also with higher accuracy.

Figure 6:
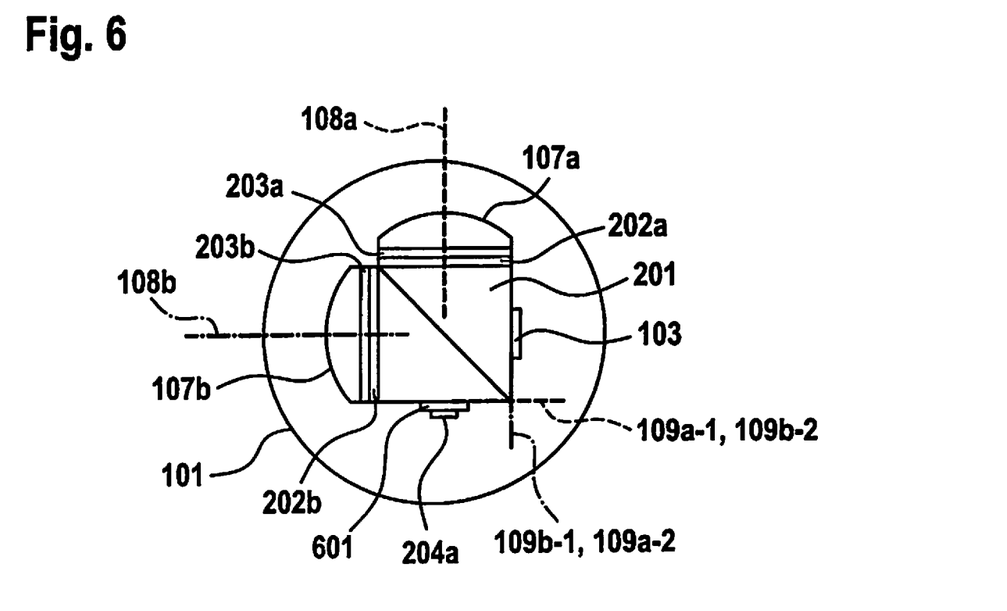
FIG. 6 shows a LIDAR sensor including a beam splitter as part of the refractive element, two receiving units, two transmitting units and a liquid crystal retarder unit.

The exemplary embodiment of a LIDAR sensor shown in FIG. 6 corresponds to the exemplary embodiment shown in FIG. 5, combination 204b having been replaced with a receiving unit 103. Furthermore, a liquid crystal retarder unit 601 may be present between beam splitter 201 and combination 204a. Liquid crystal retarder unit 601 may be activated in such a way that it acts on the polarization of electromagnetic radiation 105 emitted by combination 204a. The polarization of the emitted electromagnetic radiation 105 may be set in such a way that it is transmitted by a polarization-selective beam splitter 201 and emitted along optical axis 108a of optical lens 107a into the surroundings. The polarization of the emitted electromagnetic radiation 105 may alternatively be set in such a way that it is reflected by polarization-selective beam splitter 201 and emitted along optical axis 108b of optical lens 107b into the surroundings.

Figure 7A:
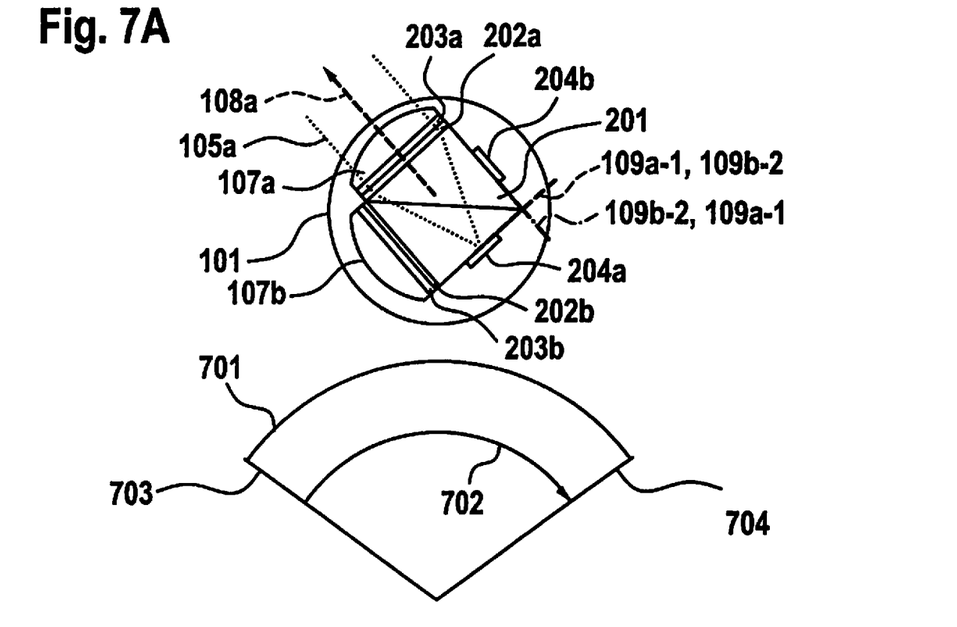
FIG. 7A shows electromagnetic radiation of a first wavelength transmitted from a combination by a beam splitter and emitted along an optical axis.

The aforementioned option of detecting an object, which is situated within an angular range in the surroundings of the LIDAR sensor, both by the one and by the other receiving unit is shown in greater detail in FIG. 7. The method shown there utilizes a LIDAR sensor as was described in FIG. 5 or 6, for example. The LIDAR sensor may include two transmitting units, either as two transmitting units 102a and 102b or as part of two combinations 204a and 204b. The LIDAR sensor may furthermore include two receiving units, either as two receiving units 103a and 103b or as part of two combinations 204a and 204b. For the sake of simplicity, FIG. 7 shows only one combination 204a and one combination 204b. In the shown exemplary embodiment, the LIDAR sensor is able to detect an angular range 701, which may be defined by boundary 703 on the one side and by boundary 704 on the other side. The angular range may be 120°, as shown in FIG. 7. However, the angular range may also be any other arbitrary angle between 0° and 360°. The angular range may also be 360°. The detection of angular range 701 may be implemented in that rotating unit 101 is activated in such a way that electromagnetic radiation is emitted at angular range 701. The LIDAR sensor may furthermore receive electromagnetic radiation from angular range 701. In the shown exemplary embodiment, in a first step, electromagnetic radiation 105a of a first wavelength may, for example, be transmitted from a combination 204a by beam splitter 201 and emitted along optical axis 108a of optical lens 107a. FIG. 7A illustrates this step. In the surroundings, the electromagnetic radiation may be reflected on an object and subsequently be received by the LIDAR sensor. Depending on the polarization and/or wavelengths, the electromagnetic radiation may be received by combination 204a or 204b, for example. Subsequently, rotating unit 101 may, for example, be activated in such a way that it rotates in direction 702. The rotation may take place in such a way that, in the next step, electromagnetic radiation 105b of a second wavelength may, for example, be transmitted from a combination 204b by beam splitter 201 and emitted along optical axis 108b of optical lens 107b. In the surroundings, the electromagnetic radiation may be reflected on an object and subsequently be received by the LIDAR sensor. Depending on the polarization and/or wavelengths, the electromagnetic radiation may be received by combination 204a or 204b, for example.

Figure 7B:
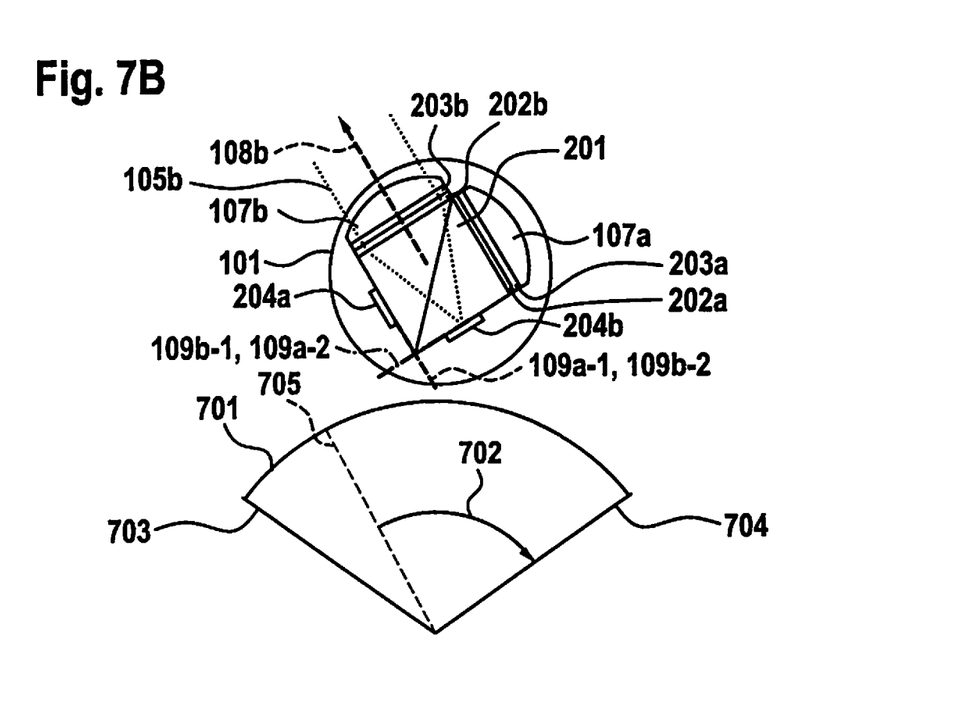
FIG. 7B shows electromagnetic radiation emitted at a different angle or in a different direction into the angular range.

The emission of the electromagnetic radiation in the second step may take place in the same direction or at the same angle within angular range 701 as in the first step. In the exemplary embodiment, this would mean that, in both steps, the emitted electromagnetic radiation 105a and 105b is emitted in parallel to boundary 703 of angular range 701. Alternatively, electromagnetic radiation 105b emitted in the second step, as shown in FIG. 7B, may also be emitted at a different angle or in a different direction 705 into angular range 701. The activation of rotating unit 101 may also take place in such a way that the electromagnetic radiation is emitted and/or received in a randomly determined chronological sequence at any angle of the angular range. As an alternative or in addition, the individual transmitting lasers of each transmitting unit 102a and/or 102b may be operated in a randomly determined chronological sequence.

Figure 8A:
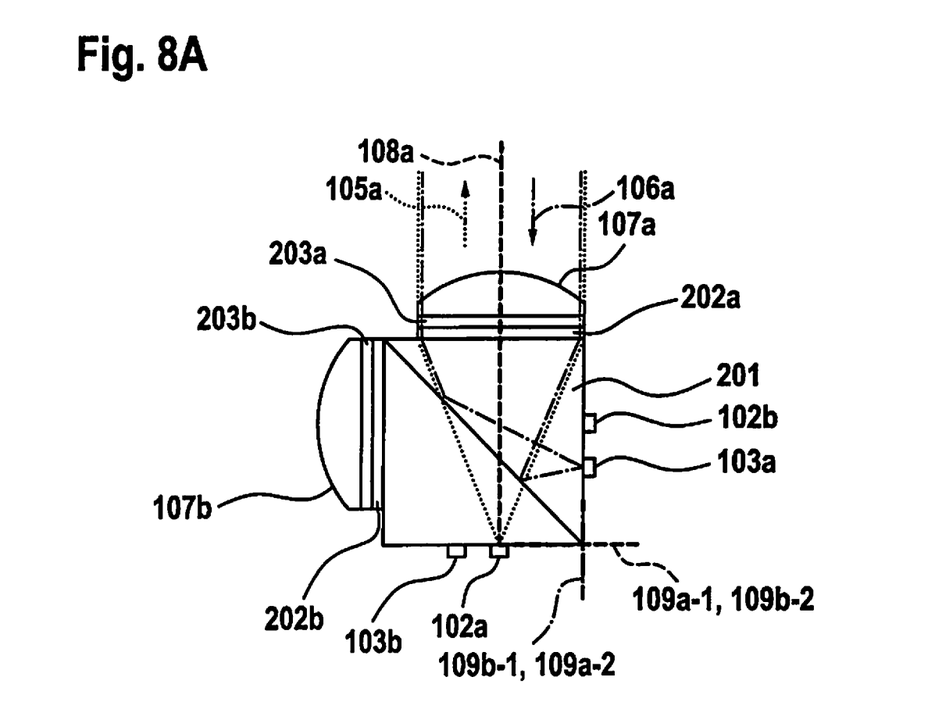
FIG. 8A shows a LIDAR sensor including a beam splitter as part of the refractive element, and two respective receiving units and transmitting units which are spatially separated from one another, the electromagnetic radiation emitted from a first one of the transmitting units.
Figure 8B:
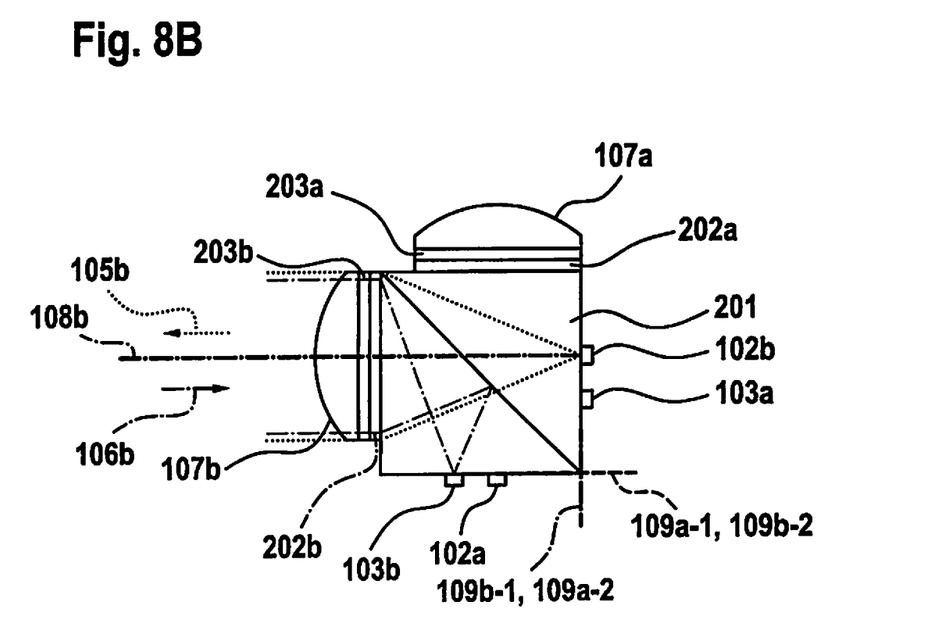
FIG. 8B shows a LIDAR sensor including a beam splitter as part of the refractive element, and two respective receiving units and transmitting units which are spatially separated from one another, the electromagnetic radiation emitted from a second one of the transmitting units.

FIG. 8 shows a further exemplary embodiment of a LIDAR sensor. Similarly to what is shown in FIG. 5 or FIG. 6, the LIDAR sensor includes a beam splitter 201, which is part of each of two refractive elements. In the exemplary embodiment of FIG. 8, the LIDAR sensor includes transmitting units 102a and 102b and receiving units 103a and 103b which are spatially separated from one another. Due to the spatial separation of transmitting units 102a and 102b from receiving units 103a and 103b, an electromagnetic interference of receiving units 103a and 103b by emitted electromagnetic radiation 105 of transmitting units 102a and 102b may be avoided. In the exemplary embodiment, the spatial separation may be implemented in that beam splitter 201 has a larger spatial expansion than optical lenses 107a and 107b. FIG. 8A shows how, for example, electromagnetic radiation 105a may be emitted by transmitting unit 102a into the surroundings. The received electromagnetic radiation 106a may, for example, be reflected on beam splitter 201 and impinge on receiving unit 103a. FIG. 8B shows how, for example, electromagnetic radiation 105b may be emitted by transmitting unit 102b into the surroundings. The received electromagnetic radiation 106b may, for example, be reflected on beam splitter 201 and impinge on receiving unit 103b. Both the emitted electromagnetic radiation 105a and 105b, and the received electromagnetic radiation 106a and 106b, may have different wavelengths and/or polarizations.

Figure 9:
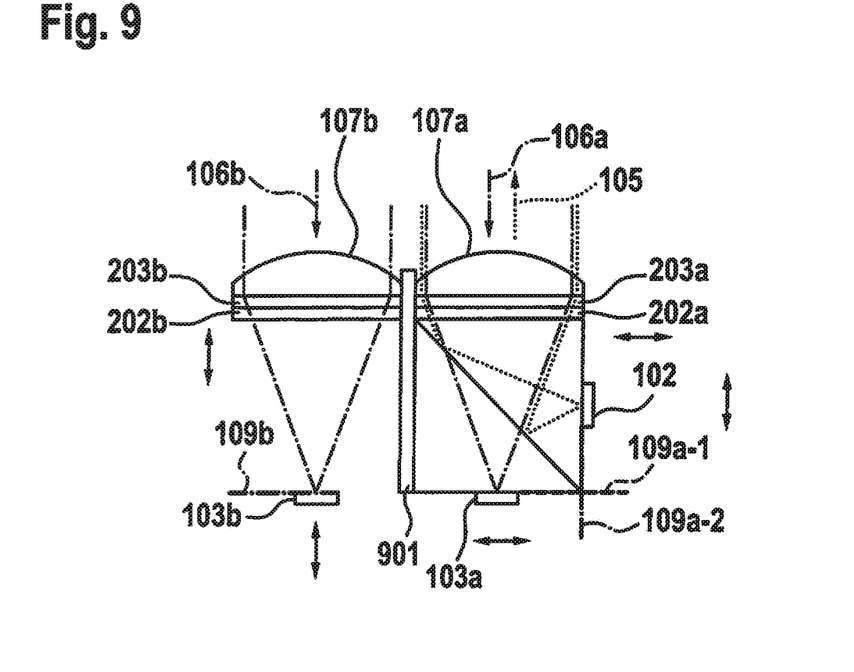
FIG. 9 shows a LIDAR sensor including a beam splitter as part of the refractive element, a transmitting unit and two receiving units which are spatially separated from one another.

FIG. 9 shows a further exemplary embodiment of a LIDAR sensor. This includes a beam splitter 201 as part of a refractive element. Furthermore, it includes one transmitting unit 102 and two receiving units 103a and 103b, which are spatially separated from transmitting unit 102 and from one another. The spatial separation also in this instance may again be advantageous for being able to avoid electromagnetic interferences of receiving units 103a and 103b. In the exemplary embodiment, transmitting unit 102 is polarized in a direction marked by the double arrow. Electromagnetic radiation 105 emitted by transmitting unit 102 is reflected on polarization-selective beam splitter 201 and emitted into the surroundings. Depending on the physical properties of an object in the surroundings, on which the electromagnetic radiation is reflected, the polarization of the electromagnetic radiation may change as a result of the reflection. Receiving unit 103a may be designed for receiving electromagnetic radiation 106a, which is polarized in a direction marked by the double arrow when impinging upon receiving unit 103a. In the exemplary embodiment, this differs from the polarization of electromagnetic radiation 105 emitted by transmitting unit 102. Electromagnetic radiation 106b, which is polarized in a direction marked by the double arrow when impinging upon receiving unit 103b, may be received by this receiving unit 103b. With such a LIDAR sensor, an object, which is situated within an angular range in the surroundings of the LIDAR sensor, may also be detected both by the one receiving unit 103a and by the other receiving unit 103b. Again, it is possible to verify a first measurement by a second measurement.

Figure 10:
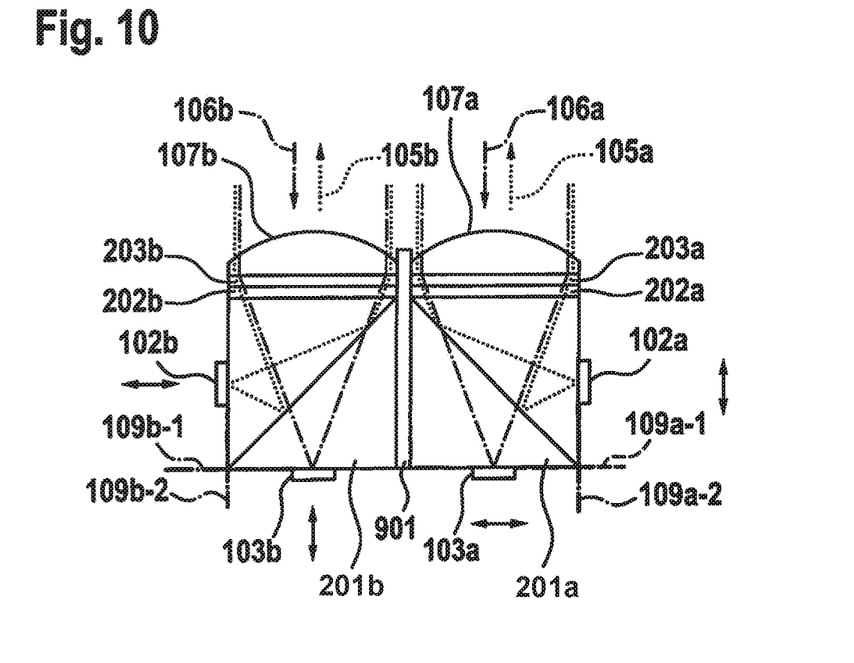
FIG. 10 shows a LIDAR sensor including two refractive elements, each including an optical lens and a beam splitter.

FIG. 10 shows a further exemplary embodiment of a LIDAR sensor. This includes two refractive elements, which each include an optical lens 107a or 107b and a beam splitter 201a or 201b. Transmitting unit 102a may emit electromagnetic radiation 105a, whose polarization may differ from the polarization of electromagnetic radiation 105b emitted by transmitting unit 102b. Furthermore, the LIDAR sensor includes two transmitting units 102a and 102b and two receiving units 103a and 103b, which are spatially separated from transmitting units 102a and 102b and also from one another. The spatial separation also in this instance may again be advantageous for being able to avoid electromagnetic interferences of receiving units 103a and 103b. With such a LIDAR sensor, an object, which is situated within an angular range in the surroundings of the LIDAR sensor, may also be detected both by the one receiving unit 103a and by the other receiving unit 103b.

Figure 11:
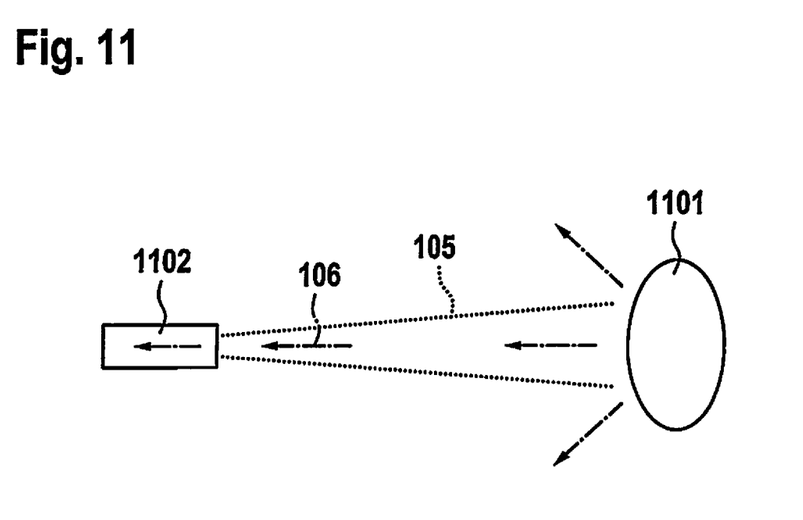
FIG. 11 shows an option for detecting the immediate surroundings with the aid of a LIDAR sensor.

FIG. 11 shows a further option for detecting the immediate surroundings with the aid of a LIDAR sensor. An electromagnetic interference of a transmitting unit 102 positioned close to a receiving unit 103 may be possible. This may be achieved by utilization of the so-called self-mixing interference in transmitting unit 102. Transmitting unit 102 may be designed as a vertical-cavity surface-emitting laser (VCSEL).

FIG. 12 shows one exemplary embodiment of a LIDAR sensor including a holographic optical element 1201 as the beam splitter. As described in the other exemplary embodiments, the LIDAR sensor includes a rotating unit 101. A receiving unit 102 is situated thereon, which is positioned in the one focal plane 109-1 of the refractive element. A receiving unit 103 is positioned in a second focal plane 109-2. It is again possible that alternative combinations 204a and/or 204b of a transmitting unit and a receiving unit are positioned in one focal plane and/or in both focal planes. In the exemplary embodiment, the refractive element is formed of an optical lens 107 including a holographic optical element 1201. An angle 1202 forms between the surface of holographic optical element 1201 and optical axis 108 of optical lens 107. Holographic optical element 1201 may be polarization-selective. It may be composed of a stack of transmissive holographic optical elements for a first polarization and a reflection holographic optical element for a second polarization. As an alternative, it is also possible to use anisotropic holographic materials for forming holographic optical element 1201. In this case, it is possible that always only one defined polarization of the electromagnetic radiation is diffracted on the holographic optical structure. The LIDAR sensor may include an optical component 202, which acts on the phase of the transmitted electromagnetic radiation. The effect of the individual optical elements on the emitted electromagnetic radiation 105 and the received electromagnetic radiation 106 corresponds to the effects described in the preceding exemplary embodiments of the optical elements there. It is furthermore possible that the positions of transmitting unit 102 and of receiving unit 103 are reversed. Receiving unit 102 may also be positioned in second focal plane 109-2, receiving unit 103 then being positioned in focal plane 109-1. This may be advantageous when the diffraction efficiency of holographic optical element 1201 is not 100%. In this case, electromagnetic radiation 105 emitted by transmitting unit 102 is not diffracted 100% at holographic optical element 1201 and emitted into the surroundings. This loss may be compensated for by a higher power of transmitting unit 102. In this example, the lower diffraction efficiency would not negatively affect the reception path, but on the contrary would even have a positive effect. The received electromagnetic radiation 106 may be efficiently allowed to pass through holographic optical element 1201.

Figure 12A:
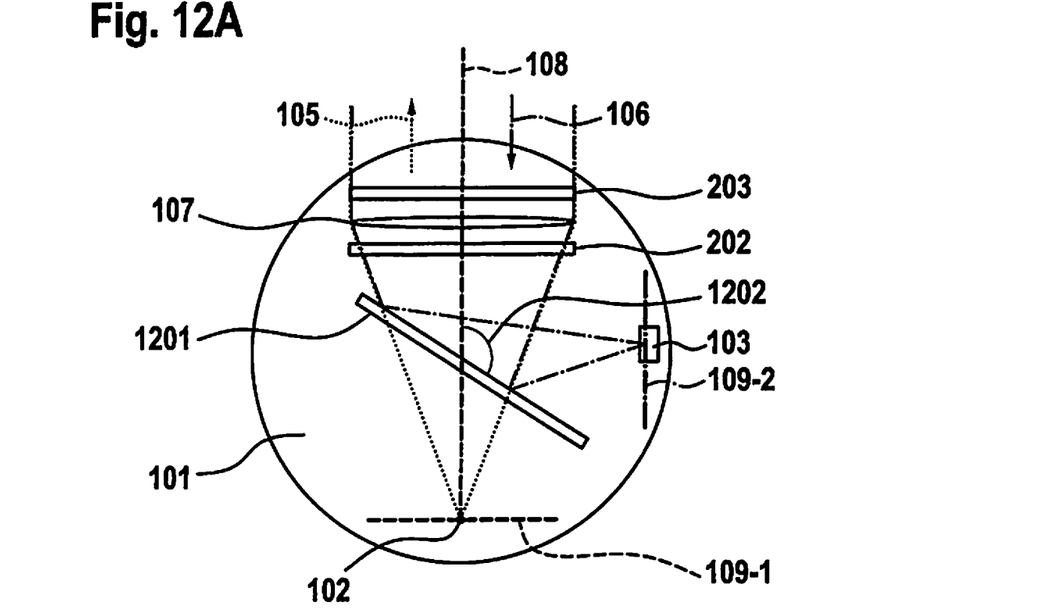
FIG. 12A shows a LIDAR sensor including a holographic optical element as the beam splitter, with a transmitting unit positioned on the optical axis of the optical lens.
Figure 12B:
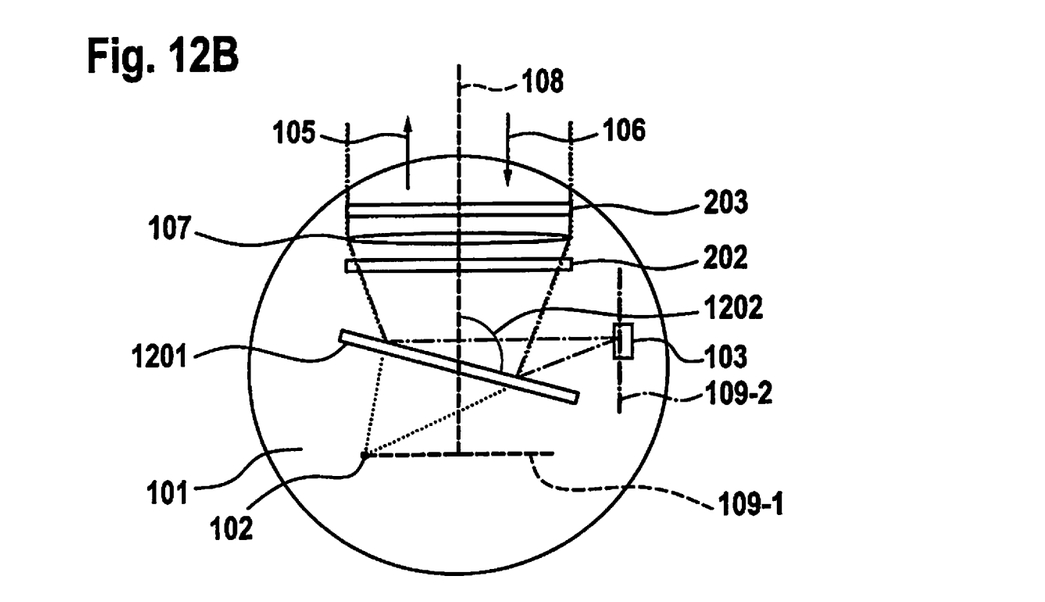
FIG. 12B shows a LIDAR sensor including a holographic optical element as the beam splitter, with the transmitting unit situated offset from the optical axis of the optical lens.

FIG. 12A shows an exemplary embodiment in which transmitting unit 102 is positioned on optical axis 108 of optical lens 107. This may be referred to as a so-called inline geometry. Since holographic optical elements having differing angles of incidence and angles of reflection may be achieved, other configurations may also be implemented, for example. For example, transmitting unit 102 is not positioned on optical axis 108 of optical lens 107 in the exemplary embodiment shown in FIG. 12B, but is situated offset therefrom on focal plane 109-1. This may be referred to as a so-called off-axis geometry. Angle 1202 of the exemplary embodiment shown in FIG. 12B is different from angle 1202 of the exemplary embodiment shown in FIG. 12A. In addition, the position of receiving unit 103 may also be selected to be different. In the exemplary embodiments shown, optical lens 107 may be optional. Its function may also be assumed by the polarization-selective holographic optical element 1201. For this purpose, holographic optical element 1201 itself may have a focusing function. Holographic optical element 1201 may furthermore have a wavelength selectivity. In this way, it may also have a filter function and, depending on the exact configuration of the LIDAR sensor or the measuring applications, replace optical filter 203.

What is claimed is:

1. A LIDAR sensor for detecting an object in surroundings, comprising:
    a first transmitting unit for emitting electromagnetic radiation;
    a first receiving unit and a second receiving unit for receiving reflected electromagnetic radiation which was reflected by the object as a reflection of the electromagnetic radiation emitted by the first transmitting unit;
    a refractive element; and
    a rotating unit on which the refractive element, the first transmitting unit, and the first and second receiving unit are arranged;
    wherein:
        the refractive element includes at least one optical lens and a beam splitter for splitting the electromagnetic radiation, and has at least a first focal plane and a second focal plane that is perpendicular to the first focal plane;
        the first transmitting unit is positioned in the first focal plane of at least one refractive element;
        the first receiving unit is positioned in the second focal plane; and
        the second receiving unit is positioned:
            in the first focal plane; or
            in a third focal plane that is parallel to the second focal plane, with the first and second receiving units arranged such that, depending on a characteristic of the reflected electromagnetic radiation, the reflected electromagnetic radiation either (a) impinges upon the first receiving unit and not the second receiving unit or (b) impinges upon the second receiving unit and not the first receiving unit.

2. The LIDAR sensor as recited in claim 1, wherein the beam splitter splits the electromagnetic radiation in at least one of a polarization-selective manner and a wavelength-selective manner.

3. The LIDAR sensor as recited in claim 1, further comprising:
    at least one of wavelength-selective, polarization-selective, and polarization-altering components are provided in a beam path of at least one of the transmitting unit and the first and second receiving units.

4. The LIDAR sensor as recited in claim 1, wherein the beam splitter is formed by at least one of a polarization-selective element and a wavelength-selective holographic element.

5. The LIDAR sensor as recited in claim 1, wherein the first transmitting unit is designed for at least one of: (i) emitting electromagnetic radiation of a selective wavelength range, and (ii) emitting electromagnetic radiation of a selective polarization direction.

6. The LIDAR sensor as recited in claim 5, wherein the LIDAR sensor further includes a second transmitting unit, and wherein at least one of:
    (i) a wavelength range of emitted electromagnetic radiation of the first transmitting unit differs from a wavelength range of emitted electromagnetic radiation of the second transmitting unit; and
    (ii) a polarization direction of the emitted electromagnetic radiation of the first transmitting unit differs from a polarization direction of the emitted electromagnetic radiation of the second transmitting unit.

7. The LIDAR sensor as recited in claim 1, wherein each of the first and second receiving units is designed for receiving electromagnetic radiation of at least one of: (i) a respective certain wavelength range, and (ii) a respective polarization direction.

8. The LIDAR sensor as recited in claim 7, wherein the respective wavelength ranges for which the first and second receiving units are designed differ from each other and/or the respective polarization directions for which the first and second receiving units are designed differ from each other.

9. The LIDAR sensor as recited in claim 1, wherein the first transmitting unit is a laser, and each of at least one of the first and second receiving units is a linear detector array or a two-dimensional detector array.

10. The LIDAR sensor as recited in claim 9, wherein the laser is a laser bar or a laser matrix.

11. The LIDAR sensor as recited in claim 1, wherein the second receiving unit is positioned in the first focal plane.

12. The LIDAR sensor as recited in claim 11, wherein the sensor is configured to identify a characteristic of the object based on determining whether the reflected electromagnetic radiation is detected by (a) only the first receiving unit or (b) by both the first receiving unit and the second receiving unit.

13. The LIDAR sensor as recited in claim 12, wherein, whether the reflected electromagnetic radiation is detected by only the first receiving unit or by both the first and second receiving units depends on a polarization of the reflected electromagnetic radiation.

14. The LIDAR sensor as recited in claim 12, wherein the characteristic of the object is whether the object is metallic.

15. The LIDAR sensor as recited in claim 1, wherein the second receiving unit is positioned in the third focal plane, and the first and second receiving units are arranged such that, depending on the characteristic of the reflected electromagnetic radiation, the reflected electromagnetic radiation either (a) impinges upon the first receiving unit and not the second receiving unit or (b) impinges upon the second receiving unit and not the first receiving unit.

16. The LIDAR sensor as recited in claim 15, wherein the first and second receiving units are situated offset from each other by a predefined distance along an alignment of the first and second focal planes.

17. The LIDAR sensor as recited in claim 15, wherein the characteristic is a polarization of the reflected electromagnetic radiation.

18. A method comprising:
providing the LIDAR sensor; and
activating the LIDAR sensor for detecting an object in surroundings;
wherein:
the LIDAR sensor includes:
a first transmitting unit for emitting electromagnetic radiation;
a first receiving unit and a second receiving unit for receiving reflected electromagnetic radiation which was reflected by the object as a reflection of the electromagnetic radiation emitted by the first transmitting unit;
a refractive element; and
a rotating unit on which the refractive element, the first transmitting unit, and the first and second receiving units are arranged;
the refractive element includes at least one optical lens and a beam splitter for splitting the electromagnetic radiation, and has at least a first focal plane and a second focal plane that is perpendicular to the first focal plane;
the first transmitting unit is positioned in the first focal plane of at least one refractive element;
the first receiving unit is positioned in the second focal plane; and
the second receiving unit is positioned:
in the first focal plane; or
in a third focal plane that is parallel to the second focal plane, with the first and second receiving units arranged such that, depending on a characteristic of the reflected electromagnetic radiation, the reflected electromagnetic radiation either (a) impinges upon the first receiving unit and not the second receiving unit or (b) impinges upon the second receiving unit and not the first receiving unit.

19. The method as recited in claim 18, wherein:
at least one of:
(i) an electromagnetic radiation wavelength range receivable by the first receiving unit differs from an electromagnetic radiation wavelength range receivable by the second receiving unit; and
(ii) an electromagnetic radiation polarization direction receivable by the first receiving unit differs from an electromagnetic radiation polarization direction receivable by the second receiving unit; and
the reception of the reflected electromagnetic radiation takes place in such a way that the reflected electromagnetic radiation, which is reflected by the object within an angular range, is received by the first receiving unit in one step, and is received by the second receiving unit in another step.

20. The method as recited in claim 18, wherein at least one of: (i) the reception of the reflected electromagnetic radiation takes place in such a way that the reflected electromagnetic radiation is received in a randomly determined chronological sequence at any angle of an angular range by at least one of the first and second receiving units, and (ii) the emission of the electromagnetic radiation takes place in such a way that transmitting lasers of the transmitting unit are operated in a randomly determined chronological sequence.

* * * * *